US010622662B2

(12) United States Patent
Cox

(10) Patent No.: US 10,622,662 B2
(45) Date of Patent: Apr. 14, 2020

(54) APPARATUS FOR STACKING BATTERY PLATES

(71) Applicant: TBS ENGINEERING LIMITED, Gloucester (GB)

(72) Inventor: David Cox, Gloucester (GB)

(73) Assignee: TBS ENGINEERING LIMITED, Gloucester (GB)

( * ) Notice: Subject to any disclaimer, the term of this patent is extended or adjusted under 35 U.S.C. 154(b) by 0 days.

(21) Appl. No.: 15/578,509

(22) PCT Filed: Jun. 3, 2016

(86) PCT No.: PCT/GB2016/051652
§ 371 (c)(1),
(2) Date: Nov. 30, 2017

(87) PCT Pub. No.: WO2016/193756
PCT Pub. Date: Dec. 8, 2016

(65) Prior Publication Data
US 2018/0159165 A1  Jun. 7, 2018

(30) Foreign Application Priority Data
Jun. 5, 2015 (GB) .................. 1509811.4

(51) Int. Cl.
*H01M 10/04* (2006.01)
*B65G 57/32* (2006.01)
(Continued)

(52) U.S. Cl.
CPC ........ *H01M 10/0404* (2013.01); *B65G 57/32* (2013.01); *H01M 10/0413* (2013.01);
(Continued)

(58) Field of Classification Search
CPC .......... H01M 10/0404; H01M 10/0413; B65G 57/32
See application file for complete search history.

(56) References Cited

U.S. PATENT DOCUMENTS 5,062,762 A * 11/1991 Wirtz .................... B21D 43/20
198/576
5,405,240 A  4/1995 Uno
(Continued)

FOREIGN PATENT DOCUMENTS

CN   104393326 A   3/2015
EP       402349 A1  12/1990
EP      0518180 A2  12/1992

OTHER PUBLICATIONS

International Search Report and Written Opinion for International applicaiton No. PCT/GB2016/051652, dated Oct. 5, 2016.
(Continued)

*Primary Examiner* — Jonathan G Jelsma
(74) *Attorney, Agent, or Firm* — Marshall, Gerstein & Borun LLP

(57) ABSTRACT

The invention relates to an apparatus for stacking battery plates comprising a delivery conveyor for supplying battery plates sequentially along a delivery path. The delivery conveyor includes a plurality of spaced apart plate carriers each configured to support at least one battery plate in use, the plate carriers defining a series of gaps between adjacent plate carriers, wherein each gap is larger than the battery plate. The apparatus further includes a stop mechanism, configured to selectively intercept the delivery path at a plurality of indexed stop positions without impeding the delivery conveyor; wherein when the stop mechanism intercepts the delivery path at a selected one of the stop positions in use, it interrupts the movement of the battery plates on the delivery conveyor causing the battery plate(s) to move off
(Continued)

the respective plate carrier and pass through the subsequent gap of the conveyor. The apparatus also includes a plate stacking mechanism for receiving battery plates as they are moved off the delivery conveyor by the stop mechanism.

19 Claims, 4 Drawing Sheets

(51) Int. Cl.
    *H01M 10/06*     (2006.01)
    *B65G 57/03*     (2006.01)
    *H01M 10/14*     (2006.01)

(52) U.S. Cl.
    CPC ........... *B65G 57/035* (2013.01); *H01M 10/06* (2013.01); *H01M 10/14* (2013.01)

(56) References Cited

U.S. PATENT DOCUMENTS

| | | | |
|---|---|---|---|
| 5,454,687 A | | 10/1995 | Johnson et al. |
| 5,669,754 A | * | 9/1997 | Croteau ................ B65H 15/00 198/405 |
| 5,961,274 A | | 10/1999 | Bors |
| 6,360,872 B1 | | 3/2002 | Guidetti |

OTHER PUBLICATIONS

Search Report for Application No. GB1509811.4, dated Nov. 11, 2015.

* cited by examiner

APPARATUS FOR STACKING BATTERY PLATES

FIELD OF THE INVENTION

The present invention relates to an apparatus for stacking battery plates.

BACKGROUND OF THE INVENTION

The term "battery" is used herein to include accumulators. In the manufacture of lead acid and similar batteries, battery plates are assembled into stacks or groups for insertion into a compartment of a battery box. Generally in such a stack, separators are provided between plates, or alternate plates are enveloped in a porous material in order to separate adjacent plates in the battery box.

Battery plates generally have a pasted plate construction and are brittle and porous. This means that particular care has to be taken when handling battery plates to avoid breakage and damage.

One known apparatus for stacking battery plates uses a Ferris wheel-type arrangement, having a plurality of carriers for transporting plates. A delivery conveyor feeds plates or pairs of plates into carriers at a first location. Once the plate or pair of plates is located on a carrier the Ferris wheel then rotates transport the plates to a position where a stack of plates can be accumulated, and to position a subsequent carrier to receive the next plate(s). This type of machine has a typical maximum operating speed of less than 130 plates per minute. Other machines used in the manufacture of battery plates have been developed such that they can generally be operated at a higher output than known battery plate stackers, such as the Ferris wheel type. This means that the battery stacker machine becomes a bottle-neck in the production and assembly line, effectively limiting the output of the whole production and assembly line to that of the battery stacker. Attempts have been made to increase the operating speed of existing battery stacking apparatus. However, it has not been possible to achieve the desired operating speeds. A possible solution to the problem of how to increase output would be to provide two of the known battery stacking machine operating in series. However, this increases the complexity and cost of the apparatus. Embodiments of the invention seek to provide an apparatus which overcome some or all of these problems.

SUMMARY OF INVENTION

According to a first aspect of the present invention there is provided an apparatus for stacking battery plates comprising
 a delivery conveyor for supplying battery plates sequentially along a delivery path;
 the delivery conveyor including a plurality of spaced apart plate carriers each configured to support at least one battery plate in use,
 the plate carriers defining a series of gaps between adjacent plate carriers, wherein each gap is larger than the battery plate,
 a stop mechanism, configured to selectively intercept the delivery path at a plurality of indexed stop positions without impeding the delivery conveyor;
 wherein when the stop mechanism intercepts the delivery path at a selected one of the stop positions in use, it interrupts the movement of the battery plates on the delivery conveyor causing the battery plate(s) to move off the respective plate carrier and pass through the subsequent gap of the conveyor;
 a plate stacking mechanism for receiving battery plates as they are moved off the delivery conveyor by the stop mechanism.

Each plate carrier may be configured to carry a single battery plate. Each plate carrier may be configured to carry a pair of battery plates. The stop mechanism may be configured to intercept the delivery path at a plurality of stop positions. The stop mechanism may be configured to incept the delivery path at two, three or four distinct positions. The stop mechanism may be provided on the delivery conveyor.

A stop mechanism may be provided on the delivery conveyor at each distinct stop position. Alternatively, the stop mechanism may be a unit which is moveable between each distinct stop position. The stop mechanism may be a unit which is moveable between a first location and a second, downstream location.

The apparatus may comprise a first stop mechanism provided at a first location on the delivery conveyor, and a second stop mechanism provided on the delivery conveyor at a second, downstream location.

The stop mechanism may include a moveable stop element provided on the delivery conveyor and being moveable between:
 a blocking position in which it intercepts the delivery path, and
 a retracted position in which it is spaced apart from the delivery conveyor, such that in use, the battery plate continues to move along the delivery bath beyond the stop element.

In its retracted position, the moveable stop element may be located beneath the delivery conveyor. The stop element may be rotatably moveable between the blocking position and the retracted position. The stop element may be linearly moveable between the blocking position and the retracted position.

The first stop mechanism may be a moveable stop element. The second stop mechanism may be a stationary stop element provided on the delivery conveyor.

Alternatively, the second stop mechanism may also be a moveable stop element moveable between a blocking position and a retracted position. A third stop mechanism may be provided at the third location further downstream of the second location.

A plate stacking mechanism may be provided adjacent to each stop position. A plate stacking mechanism may be provided upstream and adjacent to each stop position.

The plate stacking mechanism may include an output mechanism for moving stacks of battery plates along an output path.

Each stacking mechanism may include a lift having a stacking surface for receiving battery plates. The lift may be moveable between an upper position underneath the delivery conveyor to a lower position aligned with the output mechanism. The stacking mechanism may be configured to move a defined quantity of battery plates in a stack to the output mechanism or conveyor. The lift may move down progressively as a stack of batteries is accumulated.

Each stacking mechanism may include a sensor for determining the position of the lift. Each stacking mechanism may include an elevator for altering the position of the lift. Each stacking mechanism may include a control unit for operating the elevator mechanism. The sensor may detect the position of the lift by detecting the position of the stacking surface or the position of an uppermost plate on the stacking surface. The elevator may alter the horizontal position of the lift with respect to a reference point on the apparatus, for example the delivery conveyor or the output mechanism. The control unit may operate the elevator to move the stacking surface or the uppermost battery plate to predetermined position, for example a predetermined distance below the delivery conveyor.

The sensor may detect when a battery plate is received on the stacking surface. The control unit may be configured to operate the elevator to move the lift downwards when a battery plate is received on the stacking surface.

The control unit may be configured to monitor and control the number of plates received on the stacking surface.

The control unit may be configured to move the moveable stop element between its blocking position and its retracted position.

The control unit may be configured to deactivate the stop mechanism at the first position when the number of plates on the first stacking mechanism reaches a predefined limit. The control unit may be configured to operate the stop mechanism at the first position when the number of plates on the second stacking mechanism reaches a predefined limit.

Each stacking mechanism may include an alignment mechanism, for aligning the battery plates in a stack.

The apparatus may include a first stacking mechanism provided upstream of a first stop position, for moving battery plates to a first location on the output mechanism. The apparatus may include a second stacking mechanism provided upstream of a second stop position for moving battery plates to a second location on the output conveyor. The apparatus may comprise a third plate stacking mechanism provided upstream of a third stop position, for moving battery plates to a third location on the output mechanism or conveyor. The apparatus may comprise a plurality of stacking mechanisms for moving battery plates from the delivery path to the output mechanism or conveyor.

The first and second locations on the output mechanism may be spaced apart, such that an output buffer zone for receiving a stack of battery plates from the first stacking mechanism is formed between the first and second locations.

The output mechanism may include an output conveyor which extends downstream from the second location on the output mechanism, in a plane beneath the plane defined by the delivery conveyor. The output path may extend in a direction parallel to the delivery path. The output conveyor may extend beneath the delivery conveyor.

The output mechanism may extend or include at least one element which extends in a direction which is not parallel to the delivery path. The output mechanism may include one or more output conveyors which extend perpendicularly to the delivery path.

The apparatus may also include a reject mechanism. The reject mechanism may be provided on the delivery conveyor. The reject mechanism may be provided upstream of the first stop position.

According to a further aspect of the present invention, there is provided a method for stacking battery plates including:
providing an apparatus as previously described;
supplying battery plates sequentially along the delivery path;
operating the stop mechanism at a first stop position, thereby interrupting the movement of battery plates and causing the battery plates to move off respective plate carriers and through adjacent gaps;
receiving the battery plates on the first stacking mechanism thereby forming a first stack of battery plates;
deactivating the stop mechanism at the first stop position so that the battery plates to continue to move along the delivery path past the first stop position;
operating the stop mechanism at a second stop position, thereby interrupting the movement of battery plates and causing the battery plates to move off respective plate carriers and through adjacent gaps; and
receiving the battery plates on the second stacking mechanism thereby forming a second stack of battery plates.

The steps of receiving the battery plates on the stacking mechanism may comprise detecting the position of the uppermost battery plate as plates are received onto the stacking mechanism. The steps of receiving the battery plates on the stacking mechanism may comprise lowering the stacking mechanism to ensure that the uppermost plate of a stack is at a predefined position.

Alternatively, the steps of receiving the battery plates on the stacking mechanism may comprise detecting the position of any reference point on the stacking mechanism. The predefined position may be the distance from the delivery conveyor or the output mechanism.

The method may include monitoring the number of plates received on each stacking mechanism. The method may include deactivating the stop mechanism at the first position when the number of plates on the first stacking mechanism reaches a predefined limit. The method may include operating the stop mechanism at the first position when the number of plates on the second stacking mechanism reaches a predefined limit.

After the step of receiving the battery plates on the stacking mechanism; the method may include aligning the plates in the stack.

After the step of receiving the battery plates on the first stacking mechanism; the method may include
transferring the first stack of battery plates to an output mechanism by:
moving the first stack to a buffer zone, and then moving the first stack to an output conveyor; and
returning the first stacking mechanism to its starting position.

After the step of receiving the battery plates on the second stacking mechanism; the method may include:
transferring the second stack of battery plates to an output mechanism by:
moving the second stack to onto to an output conveyor;
returning the second stacking mechanism to its starting position.

According to a further aspect of the present invention, there is provided A battery manufacturing apparatus comprising an apparatus for stacking batteries as previously described.

Whilst the invention has been described above, it extends to any inventive combination of features set out above or in the following description or drawings.

BRIEF DESCRIPTION OF THE DRAWINGS

Specific embodiments of the invention will now be described in detail by way of example only and with reference to the accompanying drawings in which.

DESCRIPTION OF AN EMBODIMENT

Figure 1:
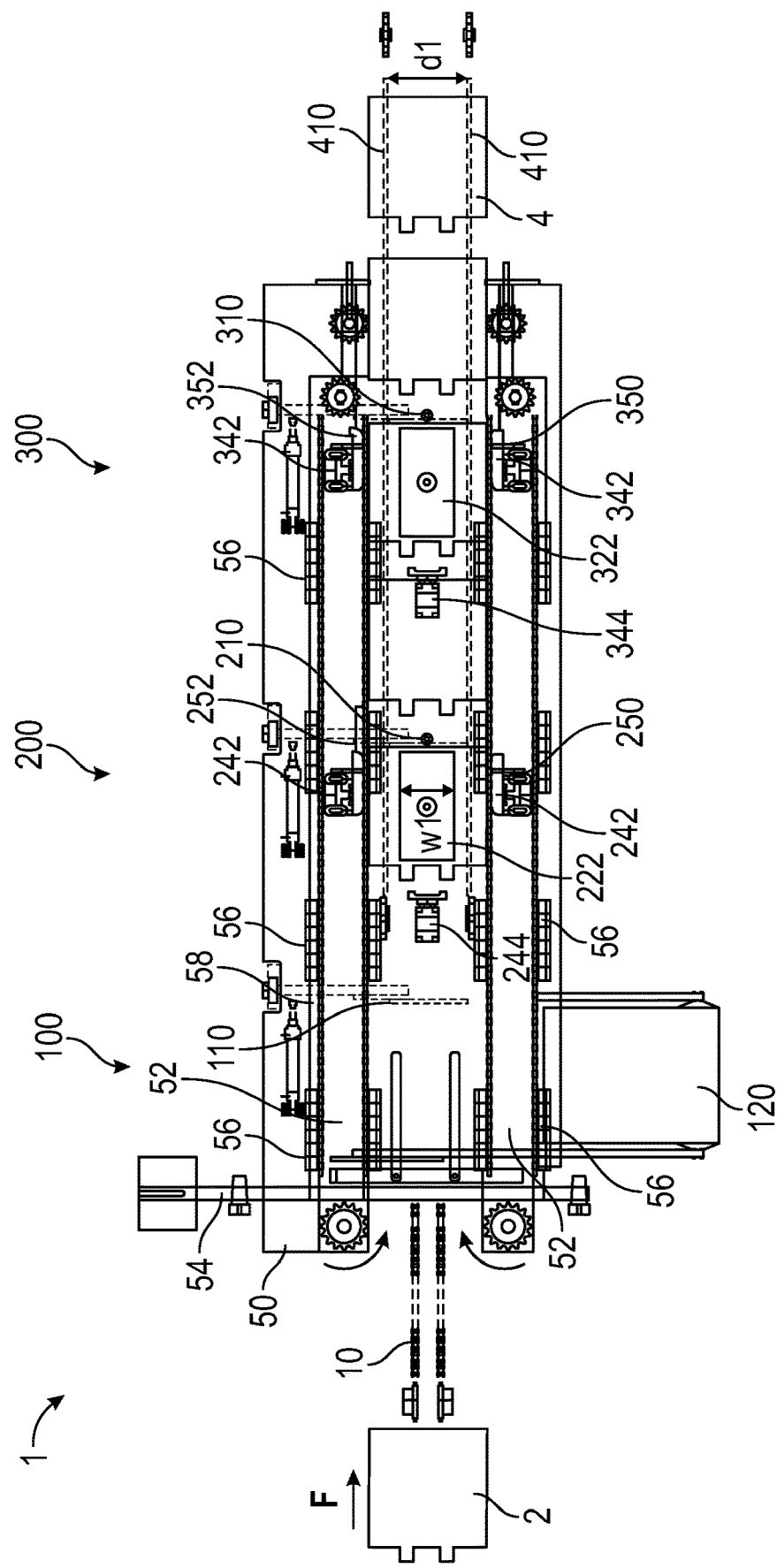
FIG. 1 is a schematic representation of a plan view of a plate stacking apparatus according to an embodiment of the invention.
Figure 2:
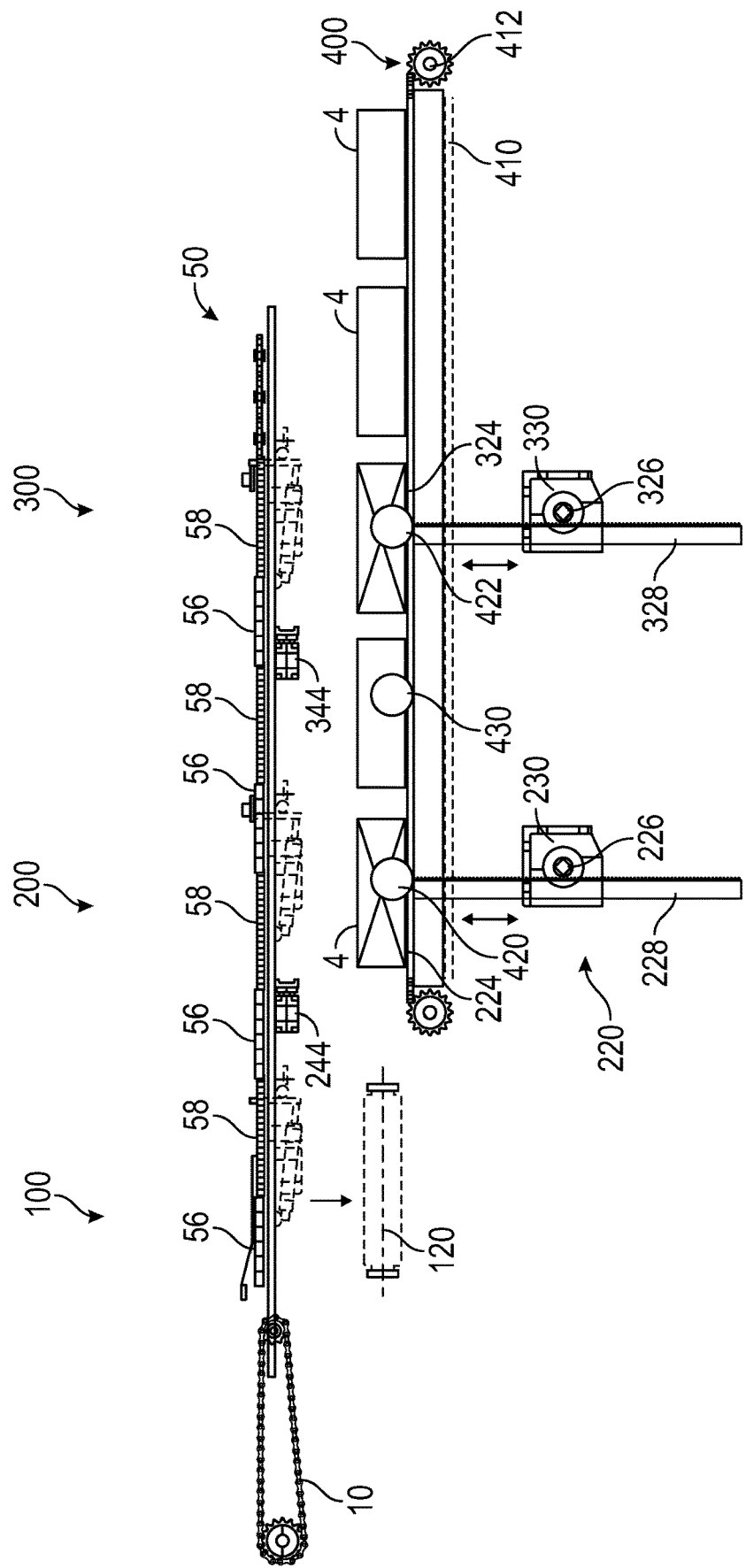
FIG. 2 is a schematic representation of a cross-sectional view of the apparatus of FIG. 1, taken through the central longitudinal axis of the apparatus.

FIGS. 1 and 2 show a battery plate stacking apparatus 1 according to an embodiment of the invention. Plates 2 are fed to the apparatus 1 by a feed conveyor 10 in direction F. The battery plates 2 are generally supplied in pairs, wherein each pair includes one enveloped plate and one non-enveloped plate. The apparatus 1 includes a delivery conveyor 50, a reject station 100, a first stacking station 200, a second stacking station 300 and an output mechanism 400. The skilled person will appreciate that a battery plate stacking apparatus may be a single machine within a battery manufacturing assembly line which could, for example, be fully automated. The feed conveyor 10 may receive plates from an enveloping apparatus and the output mechanism 400 may provide plates to a cast-on strap machine. Such machines are known to those in the art and are commercially available from the applicant, TBS Engineering.

The feed conveyor 10 supplies pairs of plates to the delivery conveyor 50. The delivery conveyor 50 includes a pair of parallel index chain conveyors 52 which extend substantially horizontally. The conveyors 52 are driven by a delivery conveyor drive 54. The conveyor chains 52 are provided with a plurality of plate carriers 56. The plate carriers 56 comprise horizontally extending projections or flights provided along the length of the two chains 52. The projections of the plate carriers 56 are aligned on the conveyors 52 to travel on parallel opposed locations on the conveyors. The projections extend across the space between the conveyors towards one another from opposed locations. Gaps 58 are provided between adjacent plate carriers 56, each gap 58 being larger than a battery plate (when the battery plate is viewed from a flat profile as shown in FIG. 1). In use, pairs of plate carriers 56 support and transport battery plates along a delivery path as the conveyors 52 are driven.

During production and enveloping of battery plates, inevitably some plates are damaged or broken, and plates which are broken or damaged beyond acceptable defined limits should not be inserted into battery boxes. Thus, the rejection station 100 is provided at an upstream position on the delivery conveyor 50. The rejection station 100 includes a reject stop 110; reject detector (not shown) and a reject conveyor 120 provided adjacent to the reject stop 110. The reject stop 110 has a stop element 112 which is rotatably moveable between a retracted position and an extended or blocking position in which it intercepts the delivery path.

Figure 3:
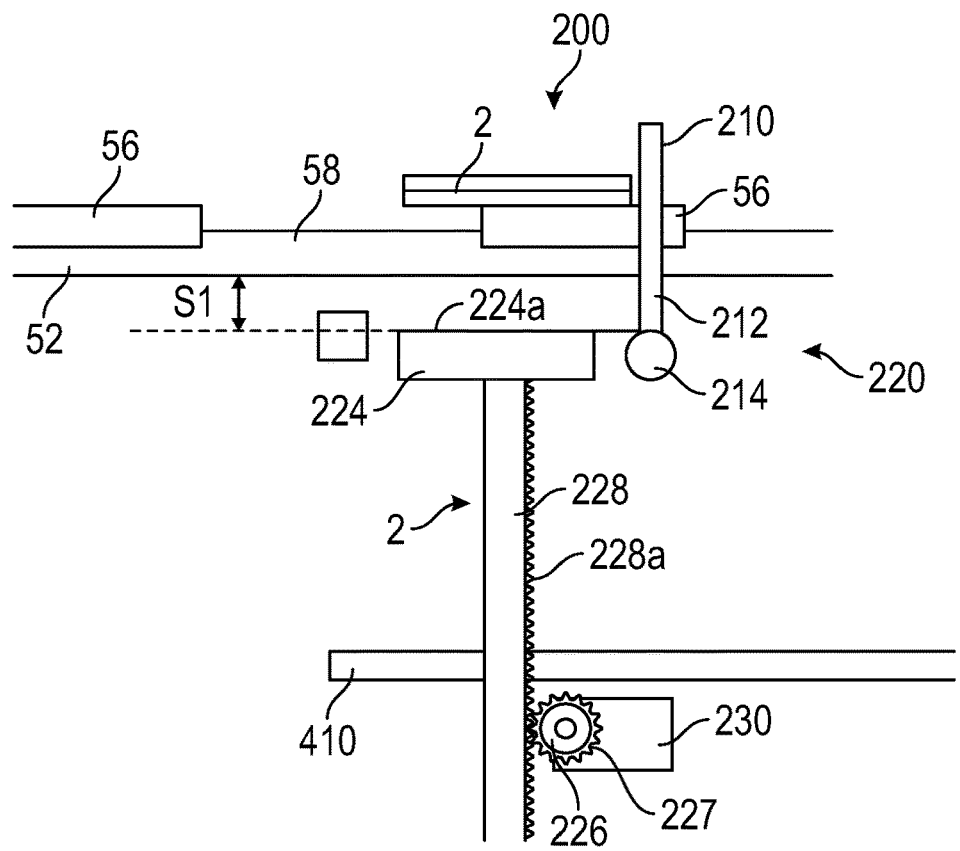
FIG. 3 is an expanded schematic representation of a plate stacking mechanism according to an embodiment of the invention.

The first plate stacking station 200, shown in more detail in FIG. 3, is provided downstream of the reject station 100. The first stacking station 200 includes a first stop 210 and a first stacking mechanism 220, located adjacent to and upstream of the first stop 210. The first stacking mechanism 220 includes a lift 222, an alignment mechanism 240, a height sensor 250 and a jamming sensor 252. As can be seen from FIG. 3, the lift 222 comprises a stacking platform 224 having an upper stacking surface 224a, a drive motor 226 for elevating and elevating the lift 222, and a first control unit 230. In use, the height sensor 240 monitors or detects the height of the upper stacking surface 224a or the height of the upper most plate in a stack formed on the upper surface 224a. In FIG. 3, the lift 222 is shown in its starting or initial position and the upper stacking surface 224a is located at a distance s1 below the underside of the conveyor 52. The first control unit 230 receives input data from the height sensor 250 and the jamming sensor 252 and outputs a control signal to the drive motor 226. In the embodiment shown, the drive motor includes a toothed gear 227 which engages with teeth 228a on a lift vertical support 228 to raise and lower the stacking platform 224. In alternative embodiments (not shown), any known arrangement for driving the stacking platform in a vertical direction can be provided. The stacking platform 224 moves between an upper position, below the delivery conveyor, and a lower position below the output conveyor 410 (see FIGS. 5a to 5d).

The second stacking station 300 is essentially the same as the first stacking station 200 and like components are given similar reference numerals for consistency and ease of understanding. The second stacking mechanism 320 includes a second lift 322, a second alignment mechanism 340, a second height sensor 350 and a second jamming sensor 352. The second lift 322 comprises a stacking platform 324 having an upper stacking surface 324a, a drive motor 326 for elevating and raising the stacking platform 324, and a second control unit 330. In the embodiment shown, the drive motor 326 includes a toothed gear 327 which engages with teeth 328a on a lift vertical support 328 to elevate and lower the stacking platform 324. The stacking platform 324 moves between an upper position, below the delivery conveyor, and a lower position below the output conveyor 410 (see FIGS. 5a to 5d).

Figure 5A:
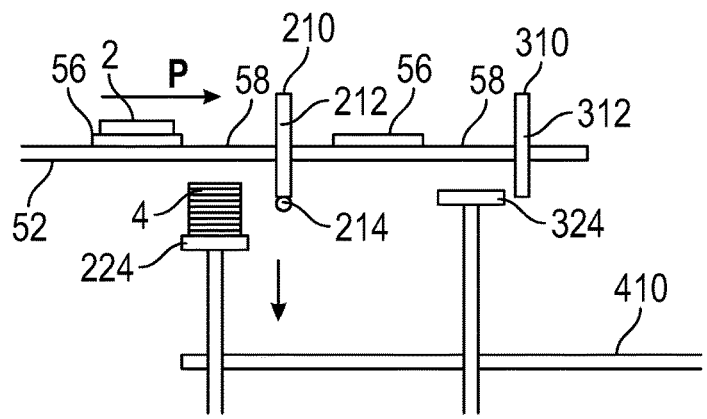
FIGS. 5a to 5d show schematically the operating sequence of the first and second plate stacking mechanisms.
Figure 5B:
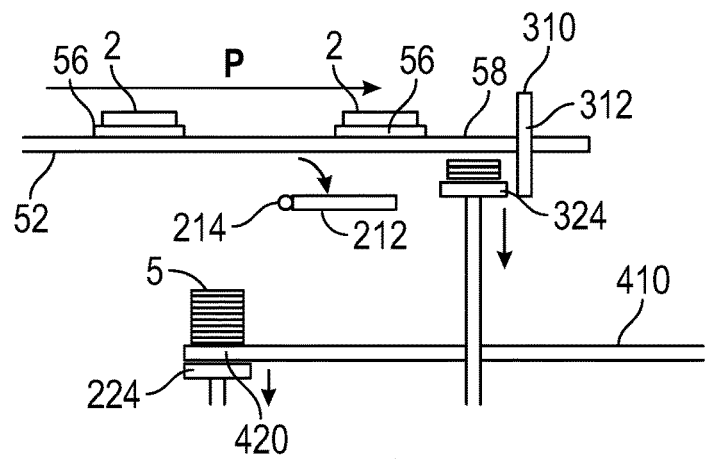
Figure 5C:
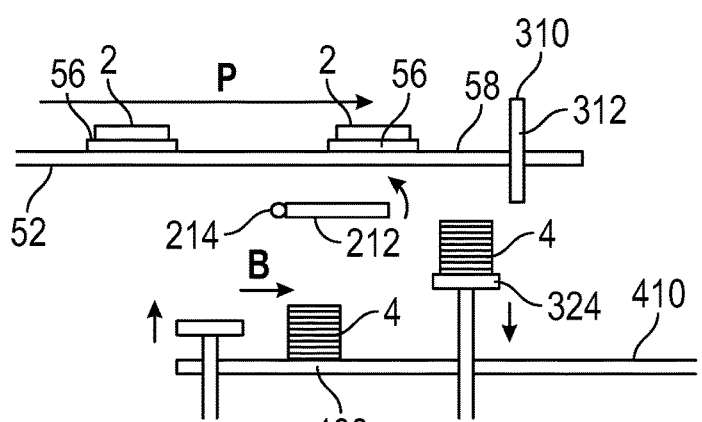

The first stop 210 includes a rotatable stop element 212 which moves between a blocking position in which it intercepts the delivery path (shown in FIGS. 2 and 3) and a retracted position, in which it is spaced apart from the delivery conveyor and does not intercept the delivery path (shown schematically in FIGS. 5b and 5c). The rotatable stop element 212 rotates about a pivot point 214. In the embodiment shown, the stop element 212 retracts to a position underneath the plate carriers 56. In FIGS. 1 and 2, the second stop 320 also comprises a rotatable stop element 312 which pivots about a pivot point 314. In FIGS. 5a to 5b, a second embodiment of the second stop 310 is schematically shown in which the stop element 312 is a stationary or non-moveable element.

The movement of first stop element 212 and the second stop element can be controlled by the first and second control units 230, 330. The operation of the stop mechanisms 210, 310 and stacking mechanisms 220, 320 is described in more detail below.

Figure 4:
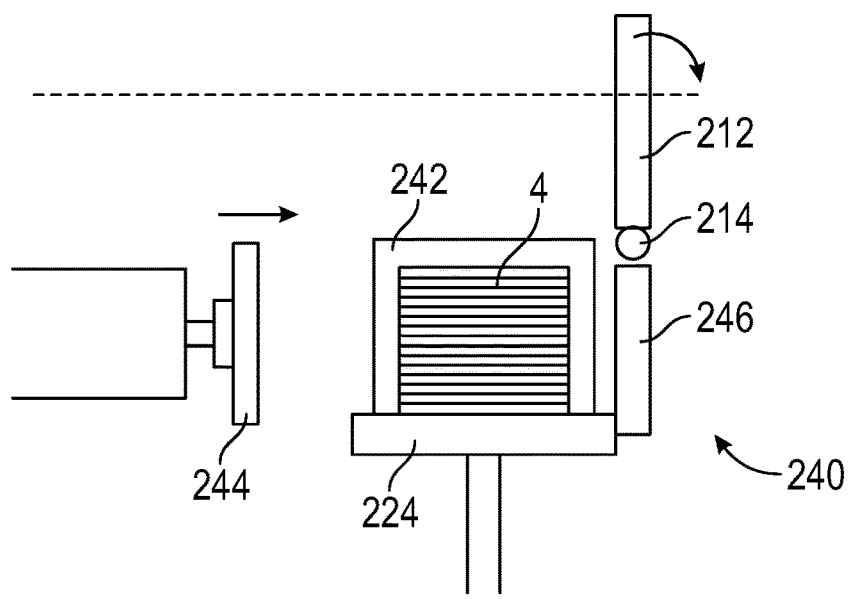
FIG. 4 is an expanded schematic representation of a stack alignment mechanism according to an embodiment of the invention.

FIG. 4 shows a schematic view of the first lift 222 when a complete stack 4 has been formed on the stacking platform 224. It should be noted that several components have been omitted from the view and the delivery path is shown with a dashed line. The alignment mechanism 240 includes a pair of moveable side alignment blocks 242, a moveable rear alignment block 244, and a stationary forward alignment block 246. In use, the rear block 244 moves forward to push the stack 4 against the forward block 246, and the side blocks 242 move inwards to ensure the stack 4 is neatly formed. In one mode of operation, when the stack 4 is complete, the stop element 212 is rotated to its retracted position, and then the alignment mechanism is operated to align a completed stack of plates. Additionally, or alternatively, the alignment mechanism may be operated during the forming of the stack. Repeated operation of the alignment mechanism during the formation of a stack could help produce a neater stack of plates, which may be particularly advantageous for plates formed of certain materials.

The height sensors 250, 350 are provided on an underside of the delivery conveyor 50 and are aligned with the stacking surface 224a when the lift is in its upper position. The height sensors 250, 350 are, for example, laser through beam sensors having a transmitter/receiver arrangement. The jamming sensors 252, 352 are provided on the delivery conveyor, and may also be laser through beam sensors. This type of sensor works by the beam being broken which detects plate present or jam up It will be appreciated that any other known sensor arrangement The output mechanism 400 for conveying stacks 4 of battery plates from the apparatus is provided beneath the delivery conveyor 50, as shown in FIG. 1. The output mechanism 400 includes two spaced apart output conveyors 410 which extend substantially parallel to the delivery conveyor 50 on either side of the lifts 222, 322. The distance d1 between the output conveyors 410 is less than the width of a battery plate 2. The stacking platform 224 has a width w1 which is less than the output conveyor spacing d1. This means that when the lift 220, is lowered the stacking platform 224 can pass through the gap between the output conveyors 410, It will be appreciated that the conveyors may support a single belt or alternatively a single conveyor of an appropriate width to support the stacks provided appropriate accommodation is made for the lifts. The output conveyors 410 are provided with a drive mechanism 412. The stack 4 on the first lift 220 is transferred onto the conveyors 410 at a first location 420, and the stack on the second lift 320 is transferred on to the conveyors at a second location 422. The output mechanism 400 also includes a buffer zone 430 between the two lifts 222, 322. In FIG. 4, the two lifts 220, 320 are shown at their lower positions.

In use, pairs of plates 2 are fed from a plate battery enveloping apparatus (not shown) onto the feed conveyor 10. The feed conveyor 10 moves the pairs of plates 2 onto the delivery conveyor 50, and the feed of plate pairs is controlled such that the pairs of plates 2 are loaded onto the plate carriers 56 of the conveyors 52.

In normal operation, the reject stop 110 is in its retracted position and battery plates are conveyed through the reject station 100. The reject station detects faults or rejects, for example a missing or double plate, misfolded envelope, envelope splice. These kinds of rejects can be detected and controlled by known machine sensor detection systems. When a faulty plate or pair of plates is detected, the reject stop 110 moves to the extended or blocking position to intercept the faulty plate or pair of plates. The faulty plate or pair of plates is pushed off its plate carrier 56 pair and falls in the direction R onto the reject conveyor 120.

Pairs of plates 2 are conveyed along the delivery path in the direction P (FIG. 5a). Initially, the first stop element 212 is in its blocking position and the first stacking lift is at its upper position. The first stop element 212 intercepts the delivery path blocking the movement of the pair of plates 2. As the conveyors 52 continue to advance, the pairs of plates 2 are pushed off their respective plate carriers 56 and the pairs of plates fall through the adjacent gaps 58. The first height sensor 240 (not shown in FIG. 5a) detects the position of the uppermost plate. As the pairs of plates 2 accumulate on the first stacking platform 224 to form a stack 4, the first control unit 230 progressively lowers the lift 222 to ensure that the height between the uppermost plate/the stacking surface and the delivery path is consistent.

When a predefined number of plates has been dropped onto the first stacking platform 224, the first control unit 230 moves the first stop element 212 to its retracted position as shown in FIG. 5b. The first alignment mechanism 240 (shown in FIG. 1) is then operated to ensure the plates are neatly stacked, and then the first lift 222 is lowered. As the first lift 222 moves to its lower position, the first stacking platform 224 moves down between the output conveyors 410 and the stack 4 is transferred onto the output conveyors 410 at the first location 420.

As shown in FIG. 5c, the pairs of plates 2 on the conveyors 52 move over the first stop element 212. They are blocked by the second stop element 312, and pushed onto the second stacking platform 324 to form a stack 4. The stack 4 from the first platform 224 is moved off the first lift 222 into the buffer zone 430 as indicated by arrow B. In the same way as described above, the second height sensor 340 (not shown in FIG. 5b) monitors the position of the uppermost plate and the second control unit 330 lowers the lift 322 to ensure that the drop height is consistent. Whist the stack 4 is being formed on the second lift 322, the empty first lift 222 is moved upwards to its upper or start position.

Figure 5D:
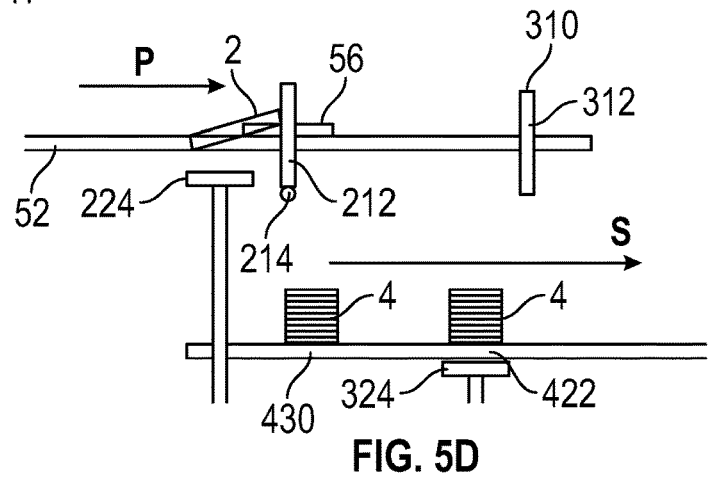

When a predefined number of plates has been dropped onto the second stacking platform 324, the second control unit 330 moves the first stop element 212 to its blocking position as shown in FIG. 5d. The second alignment mechanism 340 (shown in FIG. 1) is then operated to ensure the plates are neatly stacked, and then the second lift 322 is lowered. As the second lift 322 moves to its lower position, the second stacking platform 324 moves down between the output conveyors 410 and the stack 4 is transferred onto the output conveyors 410 at the second location 422. The output conveyors 410 then convey the two stacks 4 downstream in the direction indicated by S to the next apparatus.

In the embodiment above, the rotary stop 110, first stop 120 and second stop all include rotatably moveable stop elements. In alternative embodiments, not shown in the Figures, all or some of these stop elements could include stop elements which are linearly moveable between the retracted and blocking elements. The second stop element could also be a non-moveable element which permanently intercepts the delivery path at the second stop position.

In the embodiment above, the apparatus is described having a first control unit 230 and a second control unit 330. It is to be understood, that this is intended to include both embodiments when separate controls units are provided and when a single control unit performs the functions of the first and second control unit as described.

While the invention has been described above with reference to one or more preferred embodiments, it will be appreciated that various changes or modifications may be made without departing from the scope of the invention as defined in the appended claims.

For example, whilst the above embodiments describe the stacking of pairs of plates, it will be appreciated that in some configurations the stacker could be fed with single plates or plates pre-grouped in other numbers. The skilled person will also appreciate that the plates may vary in a single machine, for example the final plate in a stack may sometimes not be provided in a pair, in order to provide an uneven number of plates in the final stack.

The invention claimed is:

1. An apparatus for stacking battery plates comprising:
   a delivery conveyor for supplying battery plates sequentially along a delivery path, the delivery conveyor including a plurality of spaced apart plate carriers each configured to support at least one battery plate in use, and the plate carriers defining a series of gaps between adjacent plate carriers, wherein each gap is larger than the battery plate;

a first stop mechanism and a second stop mechanism configured to selectively intercept the delivery path at corresponding first and second distinct stop positions without impeding the delivery conveyor, wherein when one of the first stop mechanism and the second stop mechanism intercepts the delivery path at one of the corresponding first and second stop positions in use, it interrupts the movement of the battery plates on the delivery conveyor causing the battery plate(s) to move off the respective plate carrier and pass through the subsequent gap of the conveyor;

an output mechanism having an output conveyor, the output conveyor being configured to move complete stacks of battery plates along an output path;

a first plate stacking mechanism upstream of the first stop position, the first plate stacking mechanism being arranged to receive battery plates as they are moved off the delivery conveyor by the first stop mechanism, the first plate stacking mechanism being configured to move a first complete stack of battery plates to a first location on the output conveyor; and, a second plate stacking mechanism upstream of the second stop position, the second plate stacking mechanism being arranged to receive battery plates as they are moved off the delivery conveyor by the second stop mechanism, the second plate stacking mechanism being configured to move a second complete stack of battery plates to a second location on the output conveyor.

2. An apparatus according to claim 1, wherein the first stop mechanism is provided at the first stop position on the delivery conveyor, and the second stop mechanism is provided at the second stop position on the delivery conveyor, the second stop position being downstream from the first stop position.

3. An apparatus according to claim 2, wherein the first stop mechanism and the second stop mechanism include a moveable stop element provided on the delivery conveyor and being moveable between:
   a blocking position in which it intercepts the delivery path, and
   a retracted position in which it is spaced apart from the delivery conveyor, such that in use, the battery plate continues to move along the delivery bath beyond the stop element.

4. An apparatus according to claim 2, wherein one of the first stop mechanism and the second stop mechanism includes a moveable stop element provided on the delivery conveyor; and the other of the first stop mechanism and the second stop mechanism includes a stationary stop element provided on the delivery conveyor.

5. An apparatus according to claim 1, wherein a plate stacking mechanism is provided adjacent to each distinct stop position.

6. An apparatus according to claim 1, wherein each plate stacking mechanism includes a lift having a stacking surface for receiving battery plates, the lift being moveable between an upper position underneath the delivery conveyor to a lower position aligned with the output mechanism.

7. An apparatus according to claim 6, wherein each plate stacking mechanism further includes:
   a sensor for determining the position of the lift;
   an elevator for altering the position of the lift; and
   a control unit for operating the elevator mechanism.

8. An apparatus according to claim 7, wherein the control unit is configured to monitor and control the number of plates received on the stacking surface.

9. An apparatus according to claim 8, wherein the first stop mechanism and the second stop mechanism include a moveable stop element provided on the delivery conveyor and being moveable between:
   a blocking position in which it intercepts the delivery path, and
   a retracted position in which it is spaced apart from the delivery conveyor, such that in use, the battery plate continues to move along the delivery bath beyond the stop element; and,
wherein the control unit is configured to move the moveable stop element between its blocking position and its retracted position.

10. An apparatus according to claim 1, wherein each plate stacking mechanism includes an alignment mechanism, for aligning the battery plates in a stack.

11. An apparatus according to claim 1, wherein the first and second locations on the output conveyor are spaced apart, such that an output buffer zone for receiving a stack of battery plates from the first plate stacking mechanism is formed between the first and second locations.

12. An apparatus according to claim 1, wherein the output conveyor extends downstream from the second location on the output conveyor, in a plane beneath the plane defined by the delivery conveyor.

13. A method for stacking battery plates including:
   providing an apparatus according to claim 1;
   supplying battery plates sequentially along the delivery path;
   operating the first stop mechanism at the first stop position, thereby interrupting the movement of battery plates and causing the battery plates to move off respective plate carriers and through adjacent gaps;
   receiving the battery plates on the first plate stacking mechanism thereby forming a first stack of battery plates;
   deactivating the first stop mechanism at the first stop position so that the battery plates to continue to move along the delivery path past the first stop position;
   transferring the first stack of battery plates to the output conveyor;
   operating the second stop mechanism at the second stop position, thereby interrupting the movement of battery plates and causing the battery plates to move off respective plate carriers and through adjacent gaps;
   receiving the battery plates on the second plate stacking mechanism thereby forming a second stack of battery plates; and
   transferring the second stack of battery plates to the output conveyor.

14. A method according to claim 13, wherein the steps of receiving the battery plates on the stacking mechanism further comprises:
   detecting the position of the uppermost battery plate as plates are received onto each stacking mechanism; and,
   lowering each plate stacking mechanism to ensure that the uppermost plate of a stack is at a predefined position.

15. A method according to claim 13, wherein the method further includes:
   monitoring the number of plates received on each plate stacking mechanism;
   deactivating the first stop mechanism at the first stop position when the number of plates on the first plate stacking mechanism reaches a predefined limit; and, operating the first stop mechanism at the first stop position when the number of plates on the second plate stacking mechanism reaches a predefined limit.

16. A method according to claim 13, wherein after the step of receiving the battery plates on the first stacking mechanism; the method further includes:

aligning the plates in the stack.

17. A method according to claim 13, wherein after the step of receiving the battery plates on the first stacking mechanism; the method further includes:

transferring the first stack of battery plates to an output mechanism by:
moving the first stack to a buffer zone, and then moving the first stack to the output conveyor;
returning the first plate stacking mechanism to its starting position.

18. A method according to claim 13, wherein after the step of receiving the battery plates on the second plate stacking mechanism; the method further includes:

transferring the second stack of battery plates to an output mechanism by:
moving the second stack onto the output conveyor; and,
returning the second plate stacking mechanism to its starting position.

19. A battery manufacturing apparatus comprising an apparatus for stacking batteries as claimed in claim 1.

* * * * *